March 26, 1935. W. BUSCHBECK 1,995,839
CONDENSER ARRANGEMENT
Filed July 17, 1933
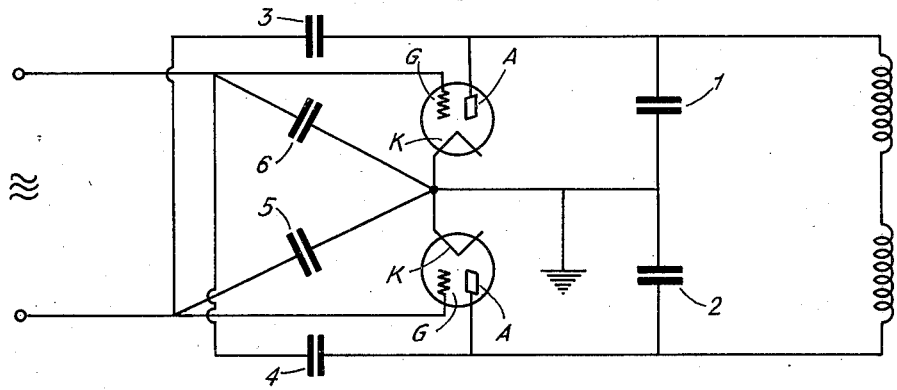
Fig. 1
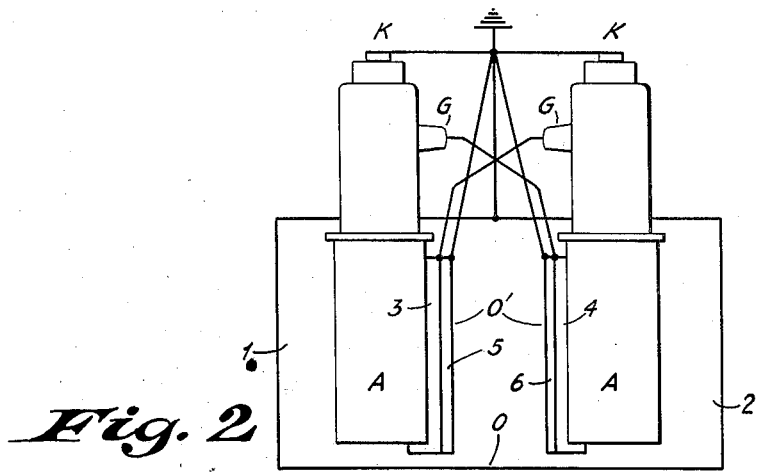
Fig. 2
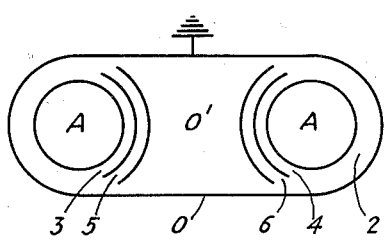
INVENTOR
WERNER BUSCHBECK
BY
ATTORNEY Patented Mar. 26, 1935

1,995,839

UNITED STATES PATENT OFFICE 1,995,839

CONDENSER ARRANGEMENT

Werner Buschbeck, Berlin, Germany, assignor to Telefunken Gesellschaft für Drahtlose Telegraphie m. b. H., Berlin, Germany, a corporation of Germany Application July 17, 1933, Serial No. 680,775
In Germany August 12, 1932

3 Claims. (Cl. 250—17)

In connection with the use of short waves, and still more so of ultra-short waves, it is of especially great importance to avoid the presence of distributed capacities and inductances as far as feasible, or, to utilize these in a profitable way wherever they are inevitable. According to this invention, therefore, those radiofrequency parts which are at radiofrequency potential in reference to ground, are designed to constitute the inner electrode of a condenser, while the outer electrode or coat thereof is grounded or at least united with a point or potential being low to ground. If the latter is the case, this electrode is surrounded by another electrode which, in turn, is connected with earth or with a lower potential to ground, etc.

The invention as just outlined shall be explained in more detail by choosing as an example a neutralized push-pull transmitter as shown in Fig. 1. Fig. 2 shows a plan and elevation of the arrangement. Plates AA which are at the highest potential to ground are enclosed by a completely grounded cylinder O. The outer cylinder therefore constitutes in the present instance, conjointly with the anode, the intermediate-circuit capacities 1 and 2, respectively, one electrode of which is at ground potential. The stray capacitance of each inner plate-half has as its cooperating or counter pole an electrode which is at grid potential and is used as the plate-grid neutralizing capacity 3 and 4, respectively. The same electrode is externally surrounded by another electrode O' connected with earth, and it constitutes conjointly therewith the grid-filament neutralizing capacity 5 and 6, respectively.

It will be seen that in this manner all of the otherwise uncontrollable spurious capacities are well fixed and are besides profitably used. In the same way as cylindrical condensers, it would also be possible to employ plate-type condensers, with the parts being subject to higher potentials having the shape of plates which upon both sides are surrounded by electrode plates which are united with lower potentials and finally connected with ground itself.

What is claimed is:

1. A short-wave transmitter comprising a plurality of electronic devices having an anode, grid and cathode, the anodes of said electronic devices being enclosed within a metallic cylinder which is connected to ground, an arc-like metallic member partially surrounding the anode of each electronic device, and a second arc-like metallic member intermediate the first mentioned arc-like member and the anode of each electronic device, said intermediate arc-like metallic member being connected to the grid of each electronic device.

2. A short-wave transmitter comprising a plurality of electronic tubes having an anode, grid and cathode, an arc-like metallic member partially surrounding the anode of said tubes and connected to the grid of each tube it surrounds, a second arc-like metallic member surrounding said first mentioned arc-like member and connected to the cathode of each tube, a third metallic member connected to ground and surrounding all of said tubes and arc-like members.

3. A short-wave transmitter comprising a push-pull amplifier stage, two electronic tubes having at least an anode, grid and cathode, the anode of each tube which is at the highest potential with respect to ground being enclosed by a completely grounded cylinder, an intermediate arc-like metallic member partially surrounding each of said tubes and connected to its grid, a second arc-like metallic member arranged outside of said intermediate arc-like member and connected to the cathode of each of said tubes and providing a grid cathode neutralizing capacity for said push-pull amplifier stage.

WERNER BUSCHBECK.